United States Patent [19]
Li et al.

[11] Patent Number: 5,579,426
[45] Date of Patent: Nov. 26, 1996

[54] FIBER IMAGE GUIDE BASED BIT-PARALLEL COMPUTER INTERCONNECT

[75] Inventors: Yao Li, Mammouth Junction; Ting Wang, Princeton, both of N.J.

[73] Assignee: NEC Research Institutes, Inc., Princeton, N.J.

[21] Appl. No.: 341,772

[22] Filed: Nov. 18, 1994

[51] Int. Cl.⁶ ........................................ G02B 6/36
[52] U.S. Cl. .................. 385/88; 385/24; 385/31; 385/33; 385/89; 385/92; 385/93; 385/116; 385/119
[58] Field of Search ................. 385/14, 15, 24, 385/31, 33, 88, 89, 92, 93, 115, 116, 119, 120

[56] References Cited

U.S. PATENT DOCUMENTS

| | | | |
|---|---|---|---|
| 4,015,115 | 3/1977 | Corcoran | 385/116 |
| 4,735,473 | 4/1988 | Migozzi et al. | 385/116 |
| 5,093,879 | 3/1992 | Bregman et al. | 385/93 |
| 5,221,984 | 6/1993 | Furuyama et al. | 359/154 |
| 5,315,423 | 5/1994 | Hong | 359/124 |
| 5,327,514 | 7/1994 | Dujon et al. | 385/115 |
| 5,345,527 | 9/1994 | Lebby et al. | 385/115 |

Primary Examiner—Brian Healy
Attorney, Agent, or Firm—Philip J. Feig

[57] ABSTRACT

A fiber image guide is used for establishing bit-parallel computer data communications. A fiber image guide is located between an input laser array driven by a first electrical circuit or computer chip and a receive detector array coupled to a second electrical circuit or computer chip for transmitting bit-parallel data from the first electrical circuit or computer chip to the second electrical circuit or computer chip.

28 Claims, 7 Drawing Sheets

FIBER IMAGE GUIDE BASED BIT-PARALLEL COMPUTER INTERCONNECT

FIELD OF THE INVENTION

The present invention relates to a fiber image guide for establishing bit-parallel computer data communications. Specifically, a fiber image guide is located between an input laser transmitter array where each laser is driven by an output from a first computer chip and an output receiver array where each receiver output signal is coupled to an input of a second computer chip.

BACKGROUND OF THE INVENTION

Fiber image guides, both coherent fiber bundles or single gradient-index fibers, are used for transmitting image signals from one end of the guide to the other end of the guide. A typical fiber bundle contains thousands of individual fiber pixels disposed in an ordered and coherent manner at their end termination. Such a fiber image guide has been successfully used in various medical endoscopic and industrial inspection applications. High resolution analog images have been achieved for certain image guides having a length of several meters. Relatively low loss (e.g. 2 dB over a distance of 10 meters) transmission can be achieved at certain transmission wavelengths by the selection of the materials used to fabricate the fiber image guide.

Modern information oriented sciences and technology are mainly driven by rapid advances in computer technology. One visible trend in computer hardware technology is that the central processing units or CPUs will process data in larger and larger parallel formats, from 8-bits in early 1980's, to 16-bits or 32-bits in mid 1980's, and to 64-bits or more in 1990's. In order to avoid unnecessary delays, technology for parallel communication channels between such CPUs and memory or input/output (I/O) devices must also be rapidly developed. Unfortunately, due to inherent bandwidth limits and electronic interference, large degree parallel electronic communication channels are very difficult to establish, especially where the communication distance is long, for instance longer than a few centimeters. A previously proposed solution was to use fiber-telecommunication teleology where a large amount of parallel information is transmitted in a time-multiplexed serial format. A limitation of this kind of arrangement is that as the bit-rate in each parallel channel increases, electronic hardware for multiplexing and demultiplexing will experience an increasing burden. For example, for a moderately high bit-rate of 500 Mhz/bit-channel, a 32-bit communication will have to use a pair of multiplexer/demultiplexer of 16 GHz, making the hardware very difficult to develop.

SUMMARY OF THE INVENTION

The present invention overcomes these limitations and provides a design for a fiber image guide based bit-parallel computer data communications.

Fiber image guides are presently available for use in computer oriented parallel digital inter-connection application. Since the interconnection distances typically are in a range from several centimeters to several meters, absorption losses and long-distance cross-talk between imaging pixels does not present a significant problem.

In accordance with the teachings of the present invention, a fiber image guide is employed to transfer bit-parallel data from a first circuit to a second circuit. The arrangement can be either one-way communication or two-way communication in the same fiber image guide.

Lens assemblies magnify and demagnify the optical data pattern into and out of the guide. Beam splitters, mirrors, fiber tapers are incorporated into the lens assembly for directing the two-way data transmission from and to respective transmitter laser arrays and detector receiver arrays. Band-pass interference filters may be used when transmitting two-way data along the fiber image guide at different wavelengths.

A principal object of the present invention is therefore, the provision of a system for communicating bit-parallel data using a fiber image guide.

The present invention will be more clearly understood when the following description is read in conjunction with the accompanying drawing.

DETAILED DESCRIPTION

Figure 1:
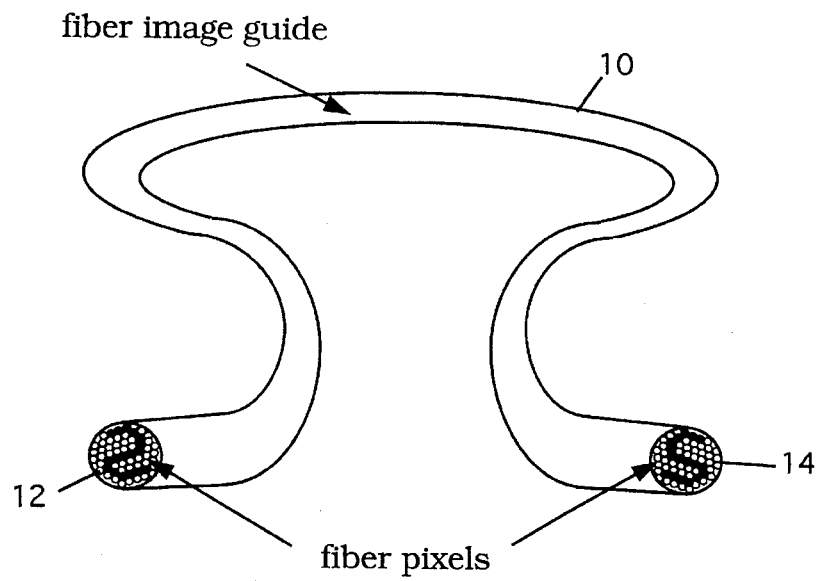
FIG. 1 is an illustration of a conventional fiber image guide.

Referring now to the figures and to FIG. 1 in particular there is shown a conventional bundle fiber image guide 10 having thousands of individual fiber pixels disposed in an ordered and coherent manner at their end terminations 12, 14. This type of fiber image guide has proven success for analog imaging applications in medical endoscopy and in industrial inspection applications.

Figure 2:
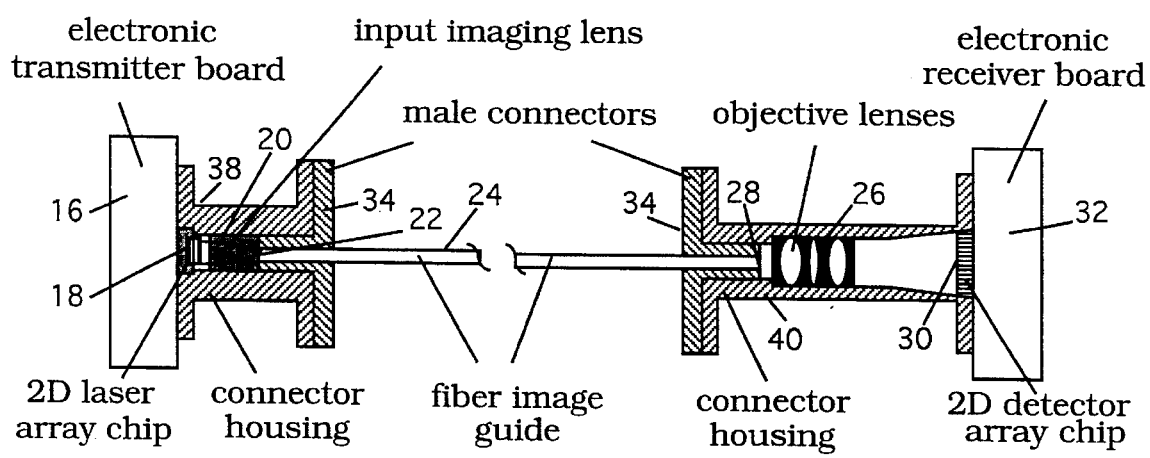
FIG. 2 is a schematic illustration, partially in cross-section, of a one-way bit-parallel optical data transmission path using a fiber image guide.

FIG. 2 shows a one-way bit-parallel optical data transmission system for sending digital parallel messages between two digital chips or circuit boards. The system includes an input electronic circuit board 16 from which bit-parallel digital electronic data are to be transmitted. A two dimensional laser array chip 18 which converts the bit-parallel digital electronic data into a corresponding bit-parallel optical format signal. An input imaging lens or lens compound 20 acts as an objective lens for imaging the bit-parallel optical format signal onto the first end surface 22 of a fiber image guide 24. The fiber image guide transmits the optical signal from the lens 20 to a remotely located objective imaging lens or lens compound 26 which receives the signal from the second end surface 28 of the fiber image guide 24. The objective imaging lens 26 magnifies and images the transmitted digital optical data pattern onto an output plane where an output two dimensional optical detector array chip 30 converts the digital output data pattern into a digital electronic data format. The signal from the detector array chip 30 is received by an electronic receiver circuit board 32 to which the original digital bit-parallel data from transmitter circuit board 16 was sent.

The above system also includes optic-mechanical mountings and connectors 34 as shown in FIG. 2. The male connectors 34 are connected to the respective ends of fiber image guide 24. Likewise the female connectors 38, 40, which also support the respective array chips 18 and 30, may be either standard or specially designed connectors for mating with connectors 34. In general, the mechanical precision of the mounting of the fiber image guide 24 to the male connector 34 should be comparable to that used for mounting multi-mode fibers.

The fiber image guide, preferably, is selected to be one of the four following types: a flexible fiber bundle guide, a rigid fiber bundle guide which can be bent only while heated to a predetermined temperature, a rigid and unbendable graded-index glass guide, or a flexible graded-index plastic or polymer guide.

The input image lens 20, preferably, may be a conventional spherical lens or alternatively, the lens may be a graded-index planar surface lens, such as a SELFOC rod lens.

The laser array 18 may comprise individual lasers arranged in either a linear array or in a two dimensional cartesian array or other geometric configuration.

The emitted spatial optical pattern from guide 24 is demagnified to form a smaller image at the second end surface 28 of the fiber image guide 24 if the area of the pattern is larger than or equal to the cross-sectional area of the fiber image guide. The smaller the area of demagnified pattern, the easier the alignment becomes at the connector 34. A sufficient spacing, however, should be maintained between the optical positions of two adjacent data points (i.e., two adjacent lasers) within the fiber image guide in order to prevent fiber cross-talk. At the output end of the fiber guide, a magnified image of the transmitted data pattern will be formed at the optical detector array chip 30. The magnification ratio does not have to exactly compensate for the demagnification ratio at the input end of the fiber image guide. In practice, in order to minimize the amplification of noise, the spacing between adjacent high speed detectors in the detector array is maintained larger than the spacing between adjacent lasers transmitting data at the same high rate. Thus, the magnified optical image of the transmitted data pattern is larger at the detector array 30 than that at the laser array chip 20. Therefore, a larger longitudinal dimension of the output female connector 40 than that of the input female connector 38 is required, as shown in FIG. 2 (not shown to scale). The detectors in array chip 30 may be linear, two dimensional cartesian or other geometrical arrangement corresponding to that of the laser array chip 18.

Figure 3:
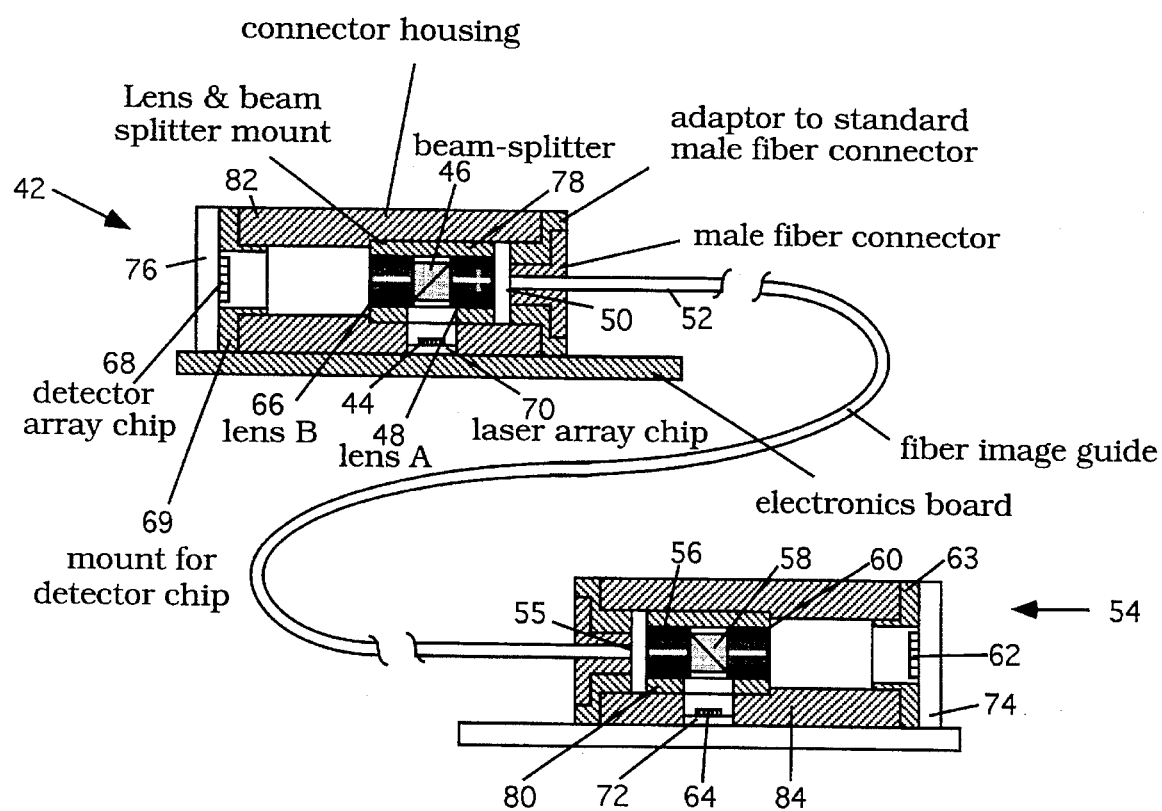
FIG. 3 is a schematic illustration, partially in cross-section, of a two-way bit-parallel optical data transmission path using a fiber image guide.

The one-way transmission system shown in FIG. 2 may be modified to create a two-way optical bit-parallel data interconnection system as shown in FIG. 3. The two counter propagating optical beams carrying bit-parallel data patterns are separated by an optical beam splitter 46, 58 at each end of the system.

A first unit 42 includes a laser array chip 44 which transmits an optical bit-parallel data pattern to a beam-splitter 46 where the data pattern is reflected through lens 48 into end 50 of fiber image guide 52. At a second unit 54, the received bit-parallel data pattern passes from end 55 of guide 52 through lens 56, beam splitter 58 and lens 60 onto detector array chip 62. In order to transmit a bit-parallel data pattern from unit 54 to unit 42, a laser array chip 64 transmits an optical bit-parallel data pattern to beam-splitter 58 where the pattern is reflected through lens 56 and into end 55 of fiber image guide 52. At end 50 of guide 52 the optical data pattern passes through lens 48, beam-splitter 46 and lens 66 onto detector array chip 68. The laser arrays 44, 64 and detector arrays 62, 68 are coupled to respective input electrical circuit boards 70, 72 and receiver electrical circuit boards 74, 76 by conventional means.

In order to satisfy the conditions of using a smaller demagnification ratio and a larger magnification ratio for the input and output patterns, respectively, the beam-splitter is disposed between two lenses. The optical sub-system, i.e., lens-beam splitter-lens, is located in separate housings 78, 80 prior to being disposed in respective connector housings 82, 84. Moreover, the detector array chips 62, 68 are held in their respective proper positions by virtue of mounting fixtures 63 and 69, respectively. Using the system shown in FIG. 3, input data are reflected by the beam-splitter and imaged with a demagnification ratio into the end of the fiber image guide. At the opposite end the guide, the data passes through two lenses before being imaged with a large magnification ratio on the receiver detector array. The use of a beam-splitter inevitably results in an unwanted image of the received pattern being provided to the laser chip array. Arrangements for minimizing the cross-talk effects are described below. A salient feature of the embodiment in FIG. 3 is the modularity of the design, so that exchange and maintenance of the apparatus are simple tasks.

Figure 4:
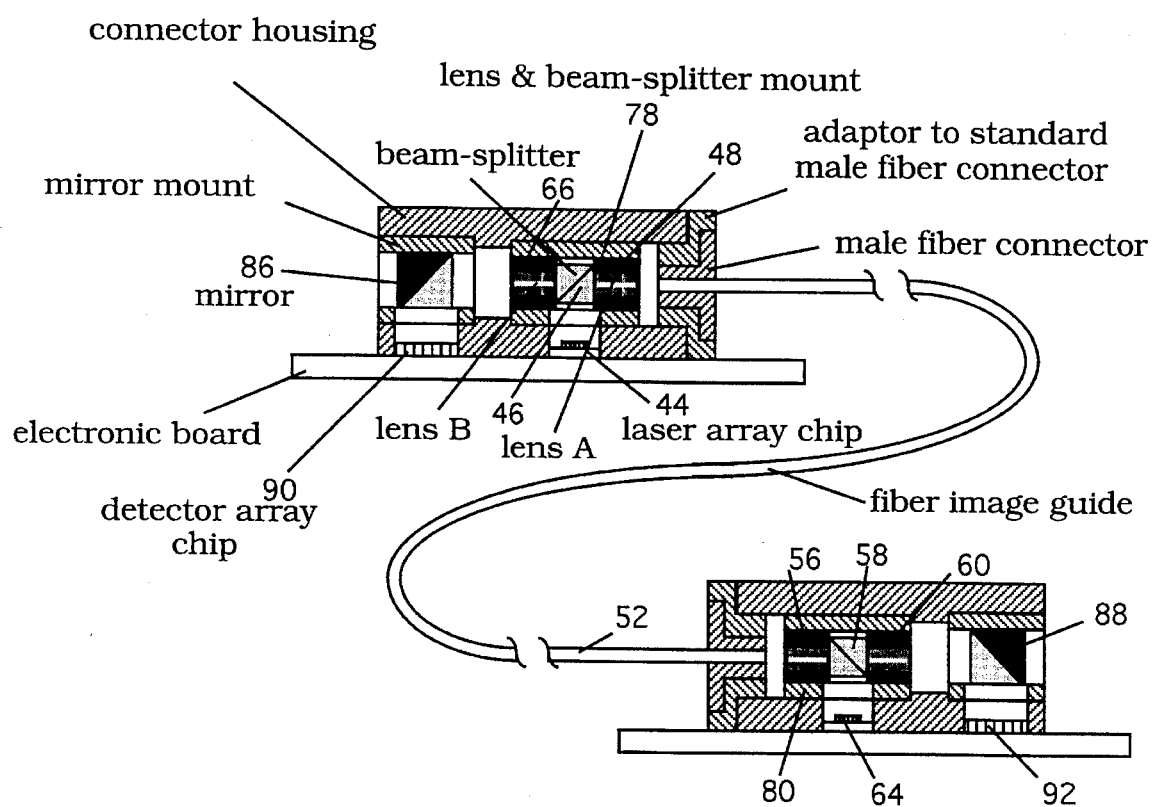
FIG. 4 is a schematic illustration, partially in cross-section, of an alternative embodiment of a two-way bit-parallel optical data transmission path using a fiber image guide.

The arrangement shown in FIG. 3 requires that the receiver array chip and the laser array chip be located in planes perpendicular to each other. FIG. 4 shows a modification of the above arrangement where by using an additional beam reflecting mirror 86, 88, the output magnified pattern image can be formed at a detector array 90, 92 located in the same plane as the respective laser array chip 44, 64. It will be apparent to those skilled in the art that in a two way optical bit-parallel data transmission system, either a unit having the laser array chip and the detector array in the same plane or in perpendicular planes may be used at either opposite ends of the fiber image guide.

The above described systems are based upon the use of laser array chips and detector array chips. In certain applications, where arrays are neither available nor suitable or where individual optical transmitters and receivers are more available or suitable, a modified system, such as that shown in FIG. 5 may be used.

Instead of forming an image of an optical pattern from a transmitter array chip, individual fiber image guides 100 each connected at one end to a respective data source (not shown) while at the other end, the fiber image guides are formed into a bundle 102 the output from which is imaged onto the end surface 104 of the fiber image guide 106. Conversely, for the received image pattern, the fiber image guides forming bundle 108 can be individually connected via individual fiber image guides 110 to receivers (not shown). The guides 100 carrying the image pattern to be transmitted are smaller diameter than the guides 110 carrying the received image pattern.

The bundles 102, 108 are connected to respective male connector 112, 114 which, in turn are inserted into respective adapters 116, 118 containing respective imaging lens 120, 122. Each end of the fiber image guide 106 is coupled to respective male connector 124, 126 which are inserted into the adapters 116, 118 for coupling the data at the respective bundle 102, 108 to the image guide 106 and vice versa.

Figure 6:
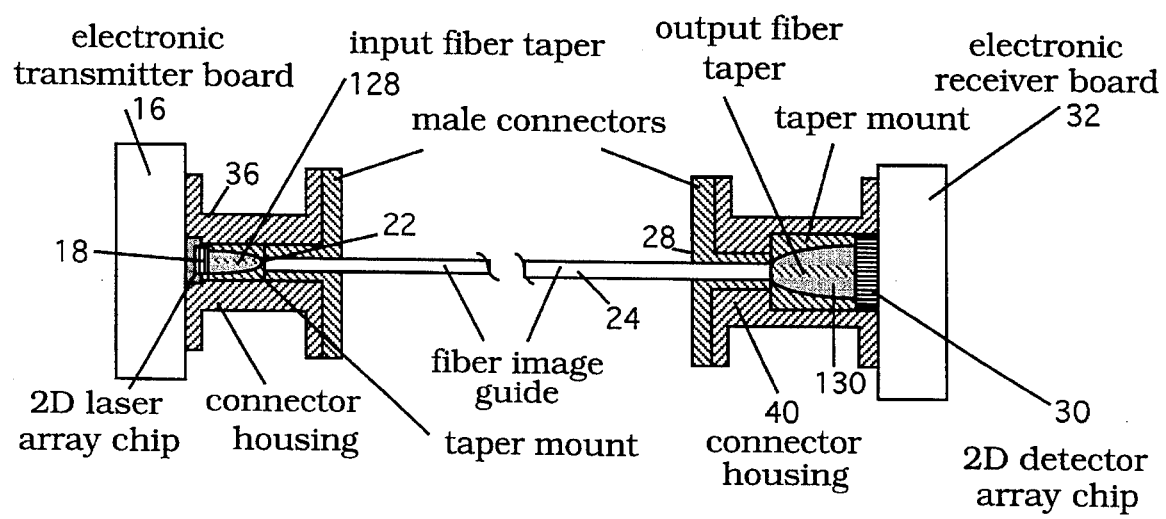
FIG. 6 is a modification of the embodiment shown in FIG. 2 which modification incorporates fiber tapers.

FIG. 6 shows a modification to the embodiment in FIG. 2 where either one or both of the lenses 20, 26 between the fiber image guide and the laser array and the detector array respectively is replaced by a coherent fiber tapers 128, 130 whose function is to demagnify and magnifying an image pattern respectively. A fiber taper is a rigid fiber bundle of taper fibers of short length. Fiber tapers are described in the publication by W. P. Siegmund entitled "Fiber Optic Tapers in Electronic Imaging," a Technical Reference of Schott Fiber Optics Inc., 1993.

The ratio of cross-section areas at the two opposite ends of the fiber tapers typically varies from 2 to 6. Once the fiber taper is fabricated, the image magnification and demagnification ratios are fixed, depending upon the direction of the image pattern through the taper.

In the embodiment shown in FIG. 6, fiber tapers are used in a one-way bit-parallel computer data transmission system. The fiber tapers are used to couple the bit-parallel image manifest at the laser array chip into the fiber image guide and to couple the image pattern from the fiber image guide to the optical detector array. An inherent advantage of such an arrangement is that the physical contact between the components results in stable and reliable interconnections which are important for practical systems.

Figure 7:
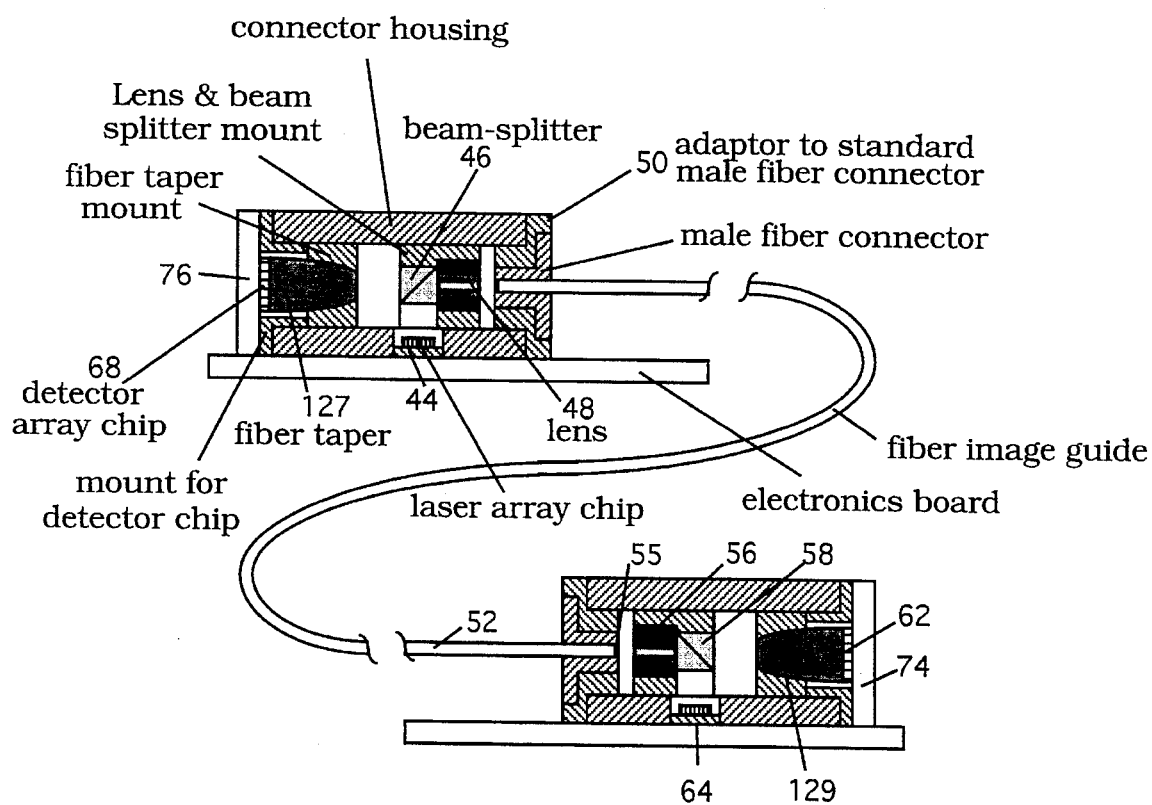
FIG. 7 is a modification of the embodiment shown in FIG. 3 which modification incorporates fiber tapers.

FIG. 7 shows a two-way bit parallel optical data transmission system similar to that shown in FIG. 3, however, the lenses used to magnify the bit-parallel data pattern provided to the receiver detector array are replaced by fiber tapers 127, 129.

Figure 5:
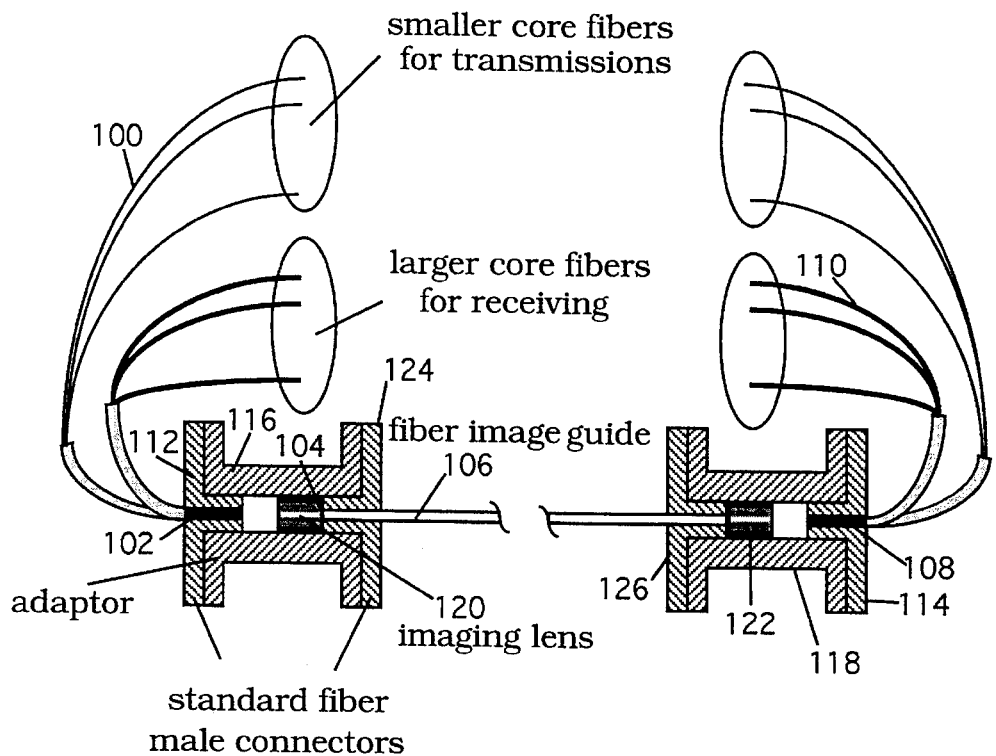
FIG. 5 is a cross-sectional illustration of the interconnection of an alternative embodiment for a bit-parallel optical data transmission path using a fiber image guide.
Figure 8:
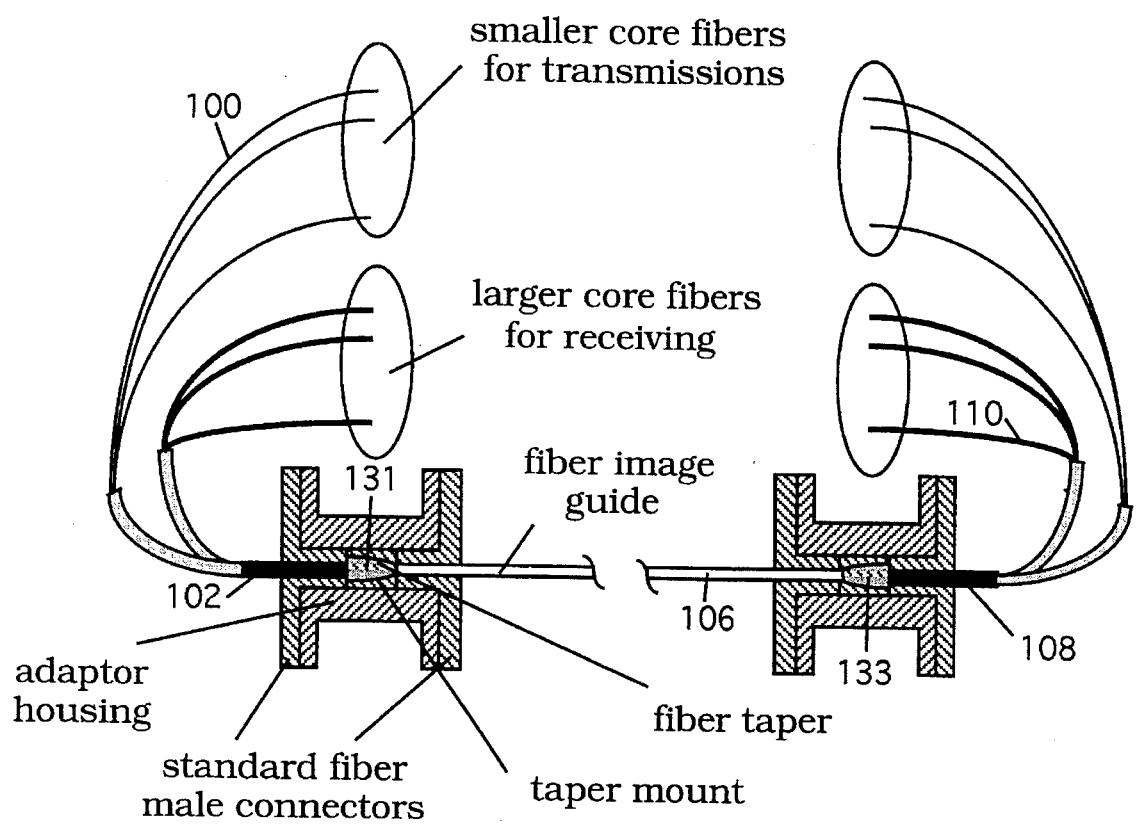
FIG. 8 is a modification of the embodiment shown in FIG. 5 which modification incorporates fiber tapers.

Similarly, the arrangement shown in FIG. 5 may be modified by replacing the lenses 104, 122 used to couple the magnified bit-parallel data pattern to the detector array chip with fiber tapers 131, 133 as shown in FIG. 8.

Figure 9A:
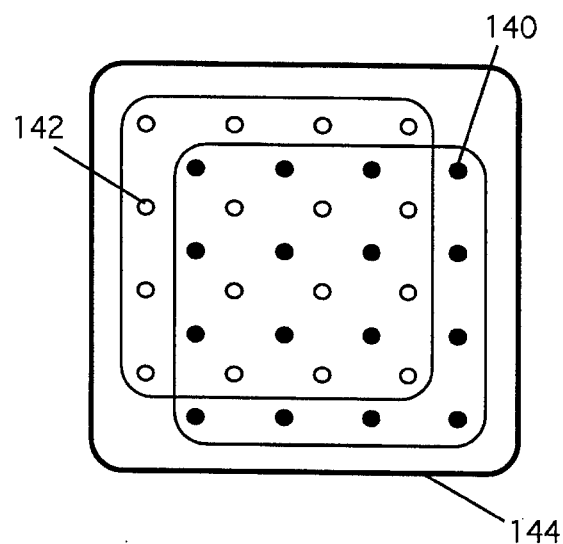
FIGS. 9A and 9B are schematic representations of preferred space division embodiments for separating input and output optical data patterns.
Figure 9B:
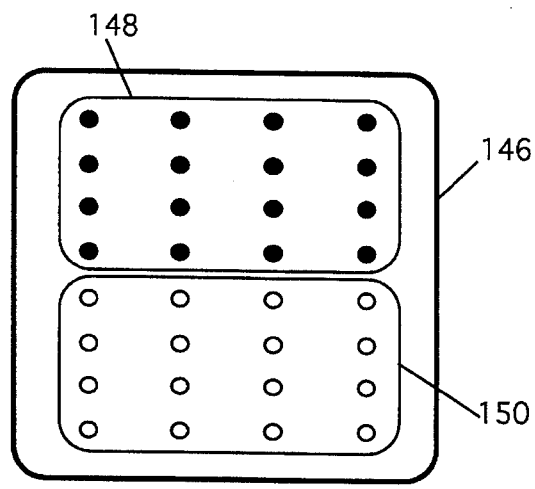

In each of the two-way communication embodiments described and illustrated, it is necessary to incorporate a space-division arrangement to separate the spatial channels of the two opposite direction data transmissions in order to avoid feedback of some optical signals to the optical transmitter laser array which could damage the lasers. FIGS. 9A and 9B illustrate two preferred space division embodiments. In FIG. 9A two 4×4 light pixel patterns are shown as shaded circles 140 and unshaded circles 142. The solid border 144 represents the effective cross-section area of a fiber image guide, one using the shaded locations and the other using the unshaded locations. Two light signal patterns are transmitted in opposite directions sharing the same fiber image guide. Since the two patterns are spatially interlaced, in principle, the transmitted optical signal patterns will be directly imaged from the respective individual lasers in the input laser array. FIG. 9B shows an alternate arrangement where the two counter propagating beams use a global space-division arrangement of the type shown. The arrangement spatially separates the cross-section area 146 of a fiber image guide into two separate regions 148, 150, each of which handle only unidirectional transmissions. The signal transmitted will, in principle, fall onto the output detector array area which is spatially separated from the transmitter laser array area. Either embodiment can be used with any of the two-way bit-parallel optical pattern transmission arrangements described. The regions 148, 150 in FIG. 9B may assume any geometric pattern and incorporate any two regions of the image guide, not only the vertically displaced two rectangular regions shown in the illustration.

Figure 10:
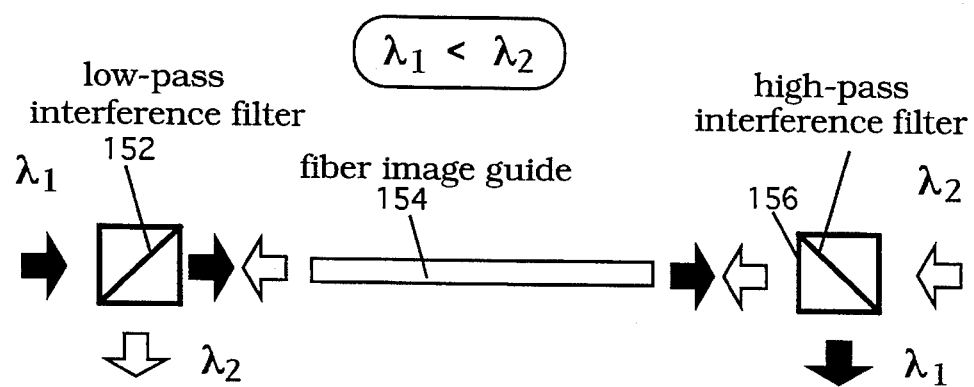
FIG. 10 is a schematic representation of a two-way bit-parallel optical data transmission arrangement using a low-pass filter and a high-pass filter.

FIG. 10 shows schematically another alternative embodiment of a two-way bit-parallel optical data transmission arrangement which relies upon an optical wavelength low-pass filter and an optical wavelength high-pass filter. When a broadband optical signal illuminates a low-pass filter, signals with optical wavelengths below a predetermined critical wavelength will be transmitted while signals with an optical wavelength above the predetermined critical wavelength will be reflected. Alternatively, for a high-pass filter, signals with wavelengths above a predetermined critical wavelength will be transmitted while signals with wavelengths below the predetermined critical wavelength will be reflected. Such filters are presently available in the form of thick Fourier hologram filters. In either case the Bragg deflection angle of the filter can be made to reflect the signal with shorter or longer wavelengths while passing the other wavelengths.

FIG. 10 shows an embodiment using a low-pass interference filter 152, a filter image guide 154 and a high pass filter 156. The remainder of the embodiment is omitted for clarity. The low wavelength signals, shown by the shaded arrows travel from a laser array through low pass interference filter 152, though fiber image guide 154 and into high-pass interference filter 156 where the optical signal is reflected toward a receive detection array (not shown). The high wavelength signals shown by unshaded arrows, traveling in the opposite direction of that of the low wavelength signals, travel from a laser array through high-pass interference filter 156, through wave guide 154 to low-pass interference filter 152 where the optical signal is reflected toward a receive detector array. The low-pass filter and the high-pass filter may be used to replace the beam-splitters shown in FIGS. 3, 4 and 7.

While there has been described and illustrated fiber image guide based bit-parallel computer interconnect embodiments, it will be apparent to those skilled in the art that variations and modifications are possible without deviating from the broad principle and spirit of the present invention which shall be limited solely by the scope of the claims appended hereto.

What is claimed is:

1. A fiber image guide based bit-parallel interconnect comprising:

a fiber image guide comprising material selected from the group consisting of a flexible fiber bundle guide, a rigid fiber bundle guide which can be bent only while heated to a predetermined temperature, a rigid and unbendable graded-index glass guide and a flexible graded-index plastic or polymer guide;

a laser array for providing a bit-parallel optical format signal;

a first imaging means for imaging the bit-parallel optical format signal onto a first end of said fiber image guide;

a second imaging means for imaging the bit-parallel optical format signal from second end of said fiber image guide as an output data pattern onto an output plane, and detector means disposed at said output plane for converting said output data pattern into electronic data.

2. A fiber image guide based bit-parallel interconnect as set forth in claim 1, where said second imaging means magnifies said bit-parallel optical format signal from said fiber image guide.

3. A fiber image guide based bit-parallel interconnect as set forth in claim 1, where said laser array comprises individual lasers.

4. A fiber image guide based bit-parallel interconnect as set forth in claim 1, where said laser array comprises a geometrically configured arrangement of lasers.

5. A fiber image guide based bit-parallel interconnect as set forth in claim 4, where said geometric arrangement is a two-dimensional cartesian array.

6. A fiber image guide based bit-parallel interconnect as set forth in claim 1, where said first imaging means demagnifies said bit-parallel optical format signal.

7. A fiber image guide based bit-parallel interconnect as set forth in claim 6, where said second imaging means magnifies said demagnified bit-parallel optical format signal from said fiber image guide.

8. A fiber image guide based bit-parallel interconnect as set forth in claim 1, where said first imaging means comprises a fiber taper.

9. A fiber image guide based bit-parallel interconnect as set forth in claim 1, where said first imaging means and said second in, aging means comprise fiber tapers.

10. A fiber image guide based bit-parallel interconnect comprising:

a fiber image guide;

a laser array for providing a bit-parallel optical format signal;

a first imaging means for imaging the bit-parallel optical format signal onto a first end of said fiber image guide;

a second imaging means for imaging the bit-parallel optical format signal from a second end of said fiber image guide as an output data pattern onto an output plane, where said first imaging means and said second imaging means comprise fiber tapers of different cross-section ratios, and detector means disposed at said output plane for converting said output data pattern into electronic data.

11. A fiber image guide based bit-parallel interconnect as set forth in claim 1, where said laser array provides a bit-parallel optical format signal of electrical bit-parallel data.

12. A fiber image guide based two way bit-parallel interconnect comprising:

a fiber image guide;

a first laser array for providing a first bit-parallel optical format signal of electrical bit-parallel data;

a first imaging system disposed for coupling said first bit-parallel optical format signal for transmission along said fiber image guide;

a second imaging system disposed for receiving said transmitted said first optical format signal from said fiber image guide, where said first imaging system and said second imaging system comprise a beam-splitter;

a first detector means for receiving a first imaged optical format signal from said second imaging system and converting same to an electrical bit-parallel data signal;

a second laser array for providing a second bit-parallel optical format signal of electrical bit-parallel data to said second imaging system for coupling to said fiber image guide, and said first imaging system disposed for receiving said transmitted said second optical format signal; and a second detector means coupled to said first imaging system for receiving a second imaged optical format signal from said first imaging system and converting same to an electrical bit-parallel data signal.

13. A fiber image guide based two-way bit-parallel interconnect as set forth in claim 12, where said first laser array and said second detector means are in substantially the same plane.

14. A fiber image guide based two-way bit-parallel interconnect as set forth in claim 13, where said second laser array and said first detector means are in substantially the same plane.

15. A fiber image guide based two-way bit-parallel interconnect as set forth in claim 12, where said first laser array comprises a plurality of fiber image guides.

16. A fiber image guide based two-way bit-parallel interconnect as set forth in claim 12, where said first detector means comprises a plurality of fiber image guides.

17. A fiber image guide based two-way bit-parallel interconnect as set forth in claim 12, where said first laser array and said first detector means comprise a plurality of fiber image guides.

18. A fiber image guide based two-way bit-parallel interconnect as set forth in claim 12, where said first imaging system comprises a fiber taper.

19. A fiber image guide based two-way bit-parallel interconnect as set forth in claim 12, where said first imaging system and said second imaging system comprise fiber tapers.

20. A fiber image guide based two way bit-parallel interconnect comprising:

a fiber image guide;

a first laser array for providing a first bit-parallel optical format signal of electrical bit-parallel data;

a first imaging system disposed for coupling said first bit-parallel optical format signal for transmission along said fiber image guide;

a second imaging system disposed for receiving said transmitted said first optical format signal from said fiber image guide, where said first imaging system and said second imaging means comprise filter tapers of different cross section ratios;

a first detector means for receiving a first imaged optical format signal from said second imaging system and converting same to an electrical bit-parallel data signal;

a second laser array for providing a second bit-parallel optical format signal of electrical bit-parallel data to said second imaging system for coupling to said fiber image guide, and said first imaging system disposed for receiving said transmitted said second optical format signal, and a second detector means coupled to said first imaging system for receiving a second imaged optical format signal from said first imaging system and converting same to an electrical bit-parallel data signal.

21. A fiber image guide based two-way bit-parallel interconnect as set forth in claim 12, where said first laser array comprises a plurality of fiber image guides and said first imaging means comprises a fiber taper.

22. A fiber image guide based two-way bit-parallel interconnect as set forth in claim 12, where said first detector means comprise plurality of fiber image guides and said second imaging means comprises a fiber taper.

23. A fiber image guide based two-way bit-parallel interconnect as set forth in claim 12, where said first laser array comprises a plurality of fiber image guides, said first detector means comprises a plurality of fiber image guides and said first imaging means and said second imaging means comprise fiber tapers.

24. A fiber image guide based two way bit-parallel interconnect comprising:

a fiber image guide;

a first laser array for providing a first bit-parallel optical format signal of electrical bit-parallel data;

a first imaging system disposed for coupling said first bit-parallel optical format signal for transmission along said fiber image guide;

a second imaging system disposed for receiving said transmitted said first optical format signal from said fiber image guide;

a first detector means for receiving a first imaged optical format signal from said second imaging system and converting same to an electrical bit-parallel data signal;

a second laser array for providing a second bit-parallel optical format signal of electrical bit-parallel data to said second imaging system for coupling to said fiber image guide, and said first imaging system disposed for receiving said transmitted said second optical format signal, and a second detector means coupled to said first imaging system for receiving a second imaged optical format signal from said first imaging system and converting same to an electrical bit-parallel data signal, where said fiber image guides spatially divides said first optical format signal and said second optical format signal traveling along said fiber image guide.

25. A fiber image guide two-way bit-parallel interconnect as set forth in claim 24, where said first optical format signal and said second optical, format signal are interlaced.

26. A fiber image guide two-way bit-parallel interconnect as set forth in claim 24, where said first optical format signal and said second optical format signal travel along separate regions of said fiber image guide.

27. A fiber image guide based two way bit-parallel interconnect comprising:

a fiber image guide;

a first laser array for providing a first bit-parallel optical format signal of electrical bit-parallel data;

a first imaging system disposed for coupling said first bit-parallel optical format signal for transmission along said fiber image guide;

a second imaging system disposed for receiving said transmitted optical format signal from said fiber image guide;

a first detector means for receiving a first imaged optical format signal from said second imaging system and converting same to an electrical bit-parallel data signal;

a second laser array for providing a second bit-parallel optical format signal of electrical bit-parallel data to said second imaging system for coupling to said fiber image guide, and said first imaging system disposed for receiving said transmitted said second optical format signal; and a second detector means coupled to said first imaging system for receiving a second imaged optical format signal from said first imaging system and converting same to an electrical bit-parallel data signal, where said fiber imaging system comprises a low-pass interference filter and said second imaging system comprises a high-pass interference system.

28. A fiber image guide two-way bit-parallel interconnect as set forth in claim 27, where said first optical format signal and said second optical format signal are at different wavelengths.

* * * * *